United States Patent
Winkler et al.

(10) Patent No.: US 7,257,658 B2
(45) Date of Patent: Aug. 14, 2007

(54) MESSAGE BASED INTERRUPT TABLE

(75) Inventors: Joerg Winkler, Ullersdorf (DE); Frank Barth, Radebeul (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 192 days.

(21) Appl. No.: 11/011,511

(22) Filed: Dec. 14, 2004

(65) Prior Publication Data
US 2006/0047877 A1 Mar. 2, 2006

(30) Foreign Application Priority Data
Aug. 31, 2004 (DE) .................. 10 2004 042 170

(51) Int. Cl.
*G06F 13/24* (2006.01)
(52) U.S. Cl. .................. 710/266; 710/268; 710/269
(58) Field of Classification Search .............. 710/260, 710/263, 266, 267, 268, 269
See application file for complete search history.

(56) References Cited

U.S. PATENT DOCUMENTS

| | | | |
|---|---|---|---|
| 5,555,430 A | | 9/1996 | Gephardt et al. |
| 6,192,442 B1* | | 2/2001 | Haren et al. .................. 710/269 |
| 6,263,397 B1* | | 7/2001 | Wu et al. .................... 710/268 |
| 6,295,573 B1* | | 9/2001 | Bailey et al. ................ 710/260 |
| 6,301,630 B1* | | 10/2001 | Chen et al. .................. 710/310 |
| 6,460,105 B1 | | 10/2002 | Jones et al. |
| 6,629,179 B1* | | 9/2003 | Bashford .................... 710/260 |
| 6,647,431 B1 | | 11/2003 | Utas |
| 6,941,398 B2* | | 9/2005 | Lai et al. .................... 710/260 |
| 2005/0228922 A1* | | 10/2005 | Tsao et al. .................. 710/268 |

FOREIGN PATENT DOCUMENTS

EP 0775959 5/2002

OTHER PUBLICATIONS

PCI Local Bus Specification, Revision 2.2, section 6.8: Message Signaled Interrupts, pp. 214-220, Dec. 18, 1998.*
Definition of Southbridge from Wikipedia, undated.*
Office Action application number German application no. 10 2004 042 170.6-53 mailed Jun. 22, 2006.

* cited by examiner

*Primary Examiner*—Khanh Dang
(74) *Attorney, Agent, or Firm*—Meyertons Hood Kivlin Kowert & Goetzel, P.C.; B. Noël Kivlin

(57) ABSTRACT

An interrupt processing technique is provided where an interrupt message is sent to an interrupt controller of a processor in response to an interrupt request from an individual device. The interrupt message comprises a memory address and interrupt status information. The memory address is specifically allocated to the device that has issued the interrupt request. The interrupt status information indicates an interrupt status of the device. An interrupt table that is stored in the memory is updated by the interrupt controller using the interrupt status information comprised in the interrupt message. The interrupt table holds device specific interrupt statuses. Updating the interrupt table comprises addressing the memory using the memory address in the interrupt message.

52 Claims, 5 Drawing Sheets

MESSAGE BASED INTERRUPT TABLE

BACKGROUND OF THE INVENTION

1. Field of the Invention

The invention generally relates to computer systems, processors and corresponding operation methods, and in particular to techniques for processing interrupts.

2. Description of the Related Art

Generally, an interrupt can be described as an asynchronous event that suspends normal processing and temporarily diverts the flow of control through an "interrupt handler" routine. Interrupts may be caused by both hardware and software. Interrupt techniques are frequently used in many existing computer system technologies.

Referring to FIG. 1, the hardware components of a common computer system layout are depicted. It is to be noted that this figures shows only one example of a motherboard layout, and other configurations exist as well. The basic elements found on the motherboard of FIG. 1 include the CPU (Central Processing Unit) 100, a northbridge 105, a southbridge 110, and system memory 115.

The northbridge 105 usually is a single chip in a core-logic chipset that connects the processor 100 to the system memory 115 and, e.g., to the AGP (Accelerated Graphic Port) and PCI (Peripheral Component Interface) buses. The PCI bus is commonly used in personal computers for providing a data path between the processor 100 and peripheral devices like video cards, sound cards, network interface cards and modems. The AGP bus is a high-speed graphic expansion bus that directly connects the display adapter and system memory 115. AGP operates independently of the PCI bus.

The southbridge 110 is usually the chip in a system core-logic chipset that controls the IDE (Integrated Drive Electronics) or EIDE (Enhanced IDE) bus, the USB (Universal Serial Bus), that provides plug-n-play support, controls the PCI-ISA (Industry Standard Architecture) bridge, manages the keyboard/mouse controller, provides power management features, and controls other peripherals.

In modern computer systems, two different kinds of interrupts can be distinguished: level sensitive interrupts (or level triggered interrupts) and edge triggered interrupts. Generally speaking, level sensitive interrupts can be viewed to define a condition for an interrupt whereas edge triggered interrupts can be viewed as a discrete event.

Standard PCI functions and devices use level sensitive interrupts. Level sensitive interrupts can be shared by multiple I/O devices, meaning that multiple I/O devices can share the same interrupt line even though individually the interrupts from each device are discrete events. That is, multiple devices can all assert the line, and when a level sensitive interrupt occurs, the ISR (Interrupt Service Routine) must poll all the devices that are sharing the interrupt line.

Edge triggered interrupts are handled differently from level sensitive interrupts because a single edge triggered interrupt counts as a single occurrence of an event while level sensitive interrupts are conditions that exist. Modern bus concepts use e.g., MSI (Message Signal Interrupt) transport mechanisms to reduce the number of sideband signals. Message signal interrupts are edge triggered.

A conventional technique for dealing with interrupts is specified in the APIC (Advanced Programmable Interrupt Controller) standard. It is used primarily in multiprocessor systems and supports interrupt redirection and interrupt transmission between processors.

Referring to FIG. 2, APIC consists of two parts at the system level. One part 250 resides in the I/O subsystem and is called I/O APIC. The other part is the so-called Local APIC 220 in the processor 200. The Local APIC 220 and the I/O APIC 250 communicate over a dedicated APIC bus 240. The I/O APIC bus interface consists of two bi-directional data signals and a clock signal.

The Local APIC unit 220 of the processor 200 contains the necessary intelligence to determine whether or not the processor 200 should accept interrupts broadcast on the APIC bus 240. The Local APIC 220 also provides local pending of interrupts, nesting and masking of interrupts, and handles all interactions with its local processor 200. The I/O APIC unit 250 consists of a set of interrupt input signals, an interrupt redirection table, programmable registers, and a message unit for sending and receiving APIC messages over the APIC bus 240. The I/O APIC unit 250 selects the corresponding entry in the redirection table and uses the information in that entry to format an interrupt request message. Each interrupt pin is individually programmable as either edge or level triggered.

FIG. 3 illustrates a conventional system configuration that uses APIC. As apparent from FIG. 3, the I/O APIC unit 330 is located in the southbridge device 320.

When a peripheral interrupt request occurs, the I/O APIC unit 330 sends an interrupt message to the processor 300. The WSC# (Write Snoop Complete) protocol forces the northbridge 310 and the processor 300 to snoop all posted writes, and provide a status indicator to the southbridge 320. The southbridge 320 (and the I/O APIC unit 330) is now free to issue a message to the processor 300 on the interrupt bus.

Another conventional approach is shown in FIG. 4. If a peripheral interrupt request occurs, the PIC (Programmable Interrupt Controller) 430 located in the southbridge 420 sends an interrupt request to the processor 400 on the INTR pin. The processor 400 then responds with an interrupt acknowledge cycle which forces the northbridge 410 to flush all posted writes.

In the conventional techniques, the general procedure is that the computer responds to an interrupt by storing the information about the current state of the running program, storing information to identify the source of the interrupt, and invoking a first-level interrupt handler. This first-level interrupt handler can discover the precise cause of the interrupt (e.g. if several devices share one interrupt) and what must be done to keep operating system tables (such as the process table) updated. This first-level handler may then call another handler, e.g. one associated with the particular device which generated the interrupt, i.e. a device driver.

However, the conventional techniques suffer from the additional communication necessary to identify the device which has experienced the interrupt event. That is, the drivers need to send a read request to access a register in the device, and the read information needs to be sent back to the driver. This may produce severe interrupt latencies. In particular where interrupts are shared by multiple devices, the drivers need to be successively activated so that each driver can check whether the interrupt event occurred at one of the devices that are associated to the respective driver. Due to the interrupt latency produced, the operating speed of the overall computer system may be significantly affected.

SUMMARY OF THE INVENTION

An improved interrupt processing technique is provided that may reduce interrupt latency, increase operating speed, and simplify the interrupt hardware structures.

In one embodiment, a method of processing interrupts in a computer system is provided that has a memory and at least one processor. The computer system is connected to one or more devices. The method comprises sending an interrupt message to an interrupt controller of the processor in response to an interrupt request from an individual one of the devices. The interrupt message comprises a memory address and interrupt status information. A memory address is specifically allocated to the device that has issued the interrupt request. The interrupt status information indicates an interrupt status of the device. The method further comprises updating by the interrupt controller an interrupt table that is stored in the memory, using the interrupt status information comprised in the interrupt message. The interrupt table holds device specific interrupt statuses. Updating the interrupt table comprises addressing the memory using the memory address comprised in the interrupt message.

In another embodiment, there is provided a computer system that comprises at least one processor and a memory. The computer system is capable of being connected to one or more devices. The at least one processor comprises an interrupt controller connected to receive an interrupt message comprising a memory address and interrupt status information. The memory address is specifically allocated to an individual one of the devices that has issued an interrupt request. The interrupt status information indicates an interrupt status of the device. The memory stores an interrupt table that holds device specific interrupt statuses. The interrupt controller is adapted to address the memory using the memory address comprised in a received interrupt message and update the interrupt table using the interrupt status information comprised in the received interrupt message.

According to a further embodiment, a processor has an interrupt controller that is adapted to receive an interrupt message comprising a memory address and interrupt status information. The memory address is specifically allocated to an individual device that has issued an interrupt request. The interrupt status information indicates an interrupt status of the device. The interrupt controller is adapted to address a memory using the memory address comprised in a received interrupt message and update an interrupt table using the interrupt status information comprised in the received interrupt message. The interrupt table is stored in the memory and holds device specific interrupt statuses.

According to still a further embodiment, a computer readable storage medium stores computer executable instructions that, when executed by a processor of a computer system, cause the computer system to perform interrupt handling by operating on an interrupt table that is stored in a memory of the computer system using interrupt status information comprised in an interrupt message. The interrupt message further comprises a memory address that is specifically allocated to a device that has issued an interrupt request. The interrupt status information indicates an interrupt status of the device. The interrupt table holds device specific interrupt statuses addressable by the memory address comprised in the interrupt message.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

As will be apparent from the more detailed description below, the embodiments provide a message based interrupt table technique that allows for the complete interrupt status to be transmitted so that merging of interrupt information at the processor interrupt controller is prevented. That is, message based interrupts are used to signal events to the processor, and individual interrupt message addresses are used for each device so that the interrupt message address can be used as index of a system memory based interrupt table.

Figure 1:
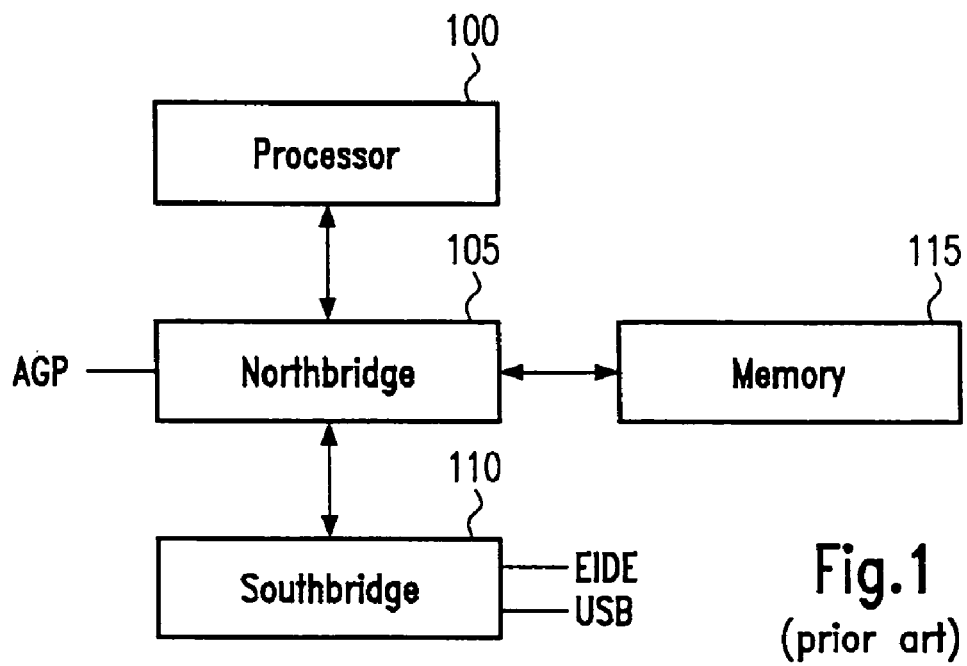
FIG. 1 is a block diagram illustrating the components of a conventional computer system.
Figure 2:
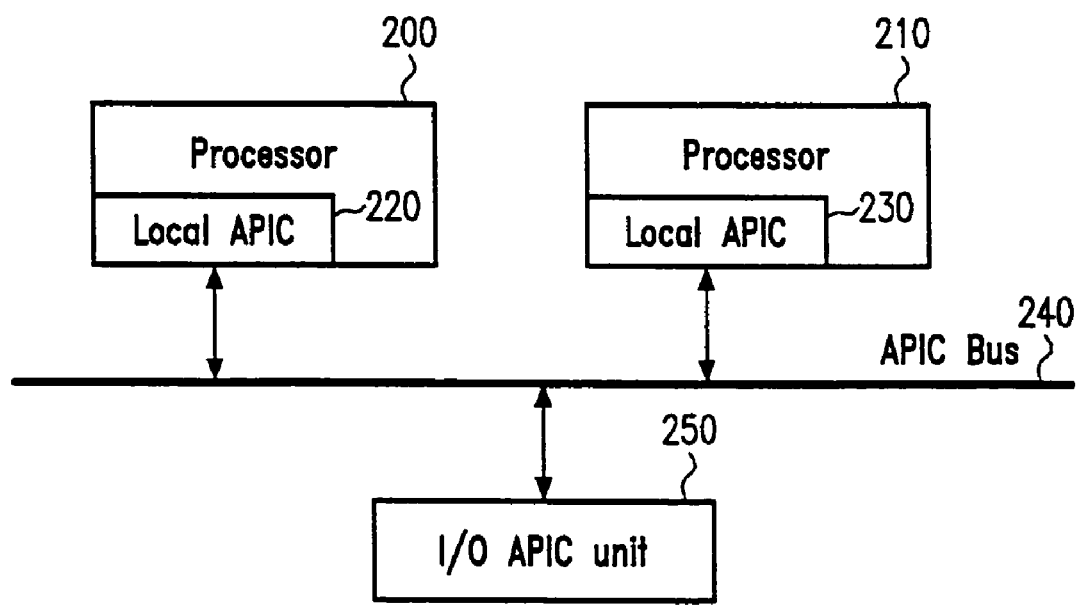
FIG. 2 illustrates APIC components at system level.
Figure 3:
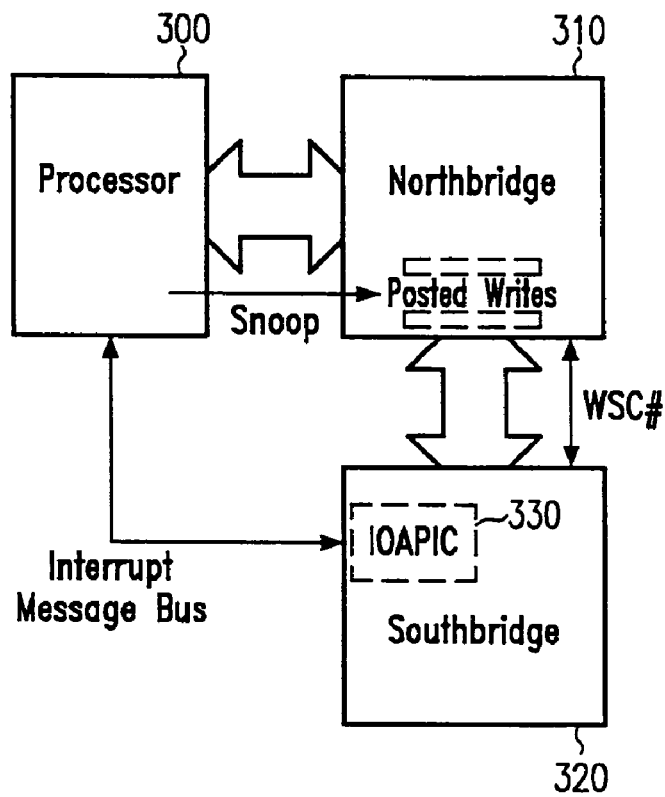
FIG. 3 illustrates an example system configuration to show the mechanism typically employed in chipsets to flush the posted write-buffers.
Figure 4:
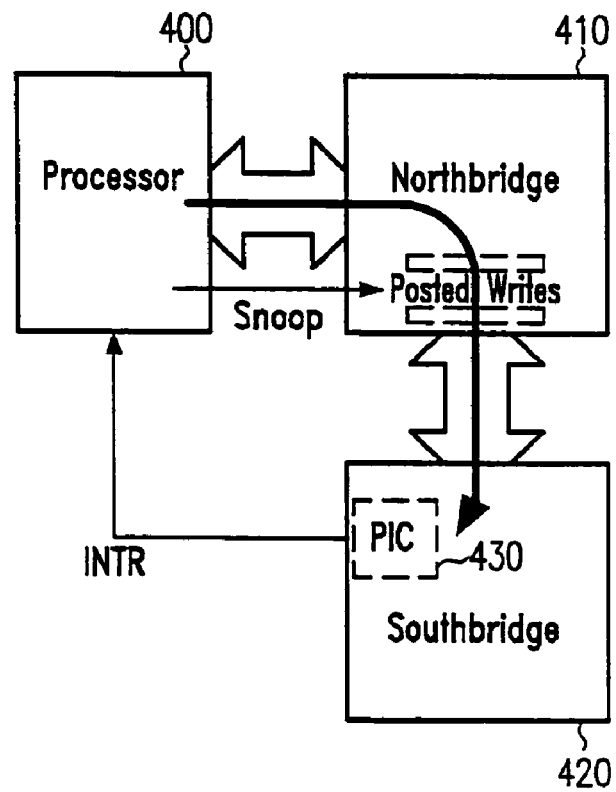
FIG. 4 illustrates another conventional system configuration.
Figure 5:
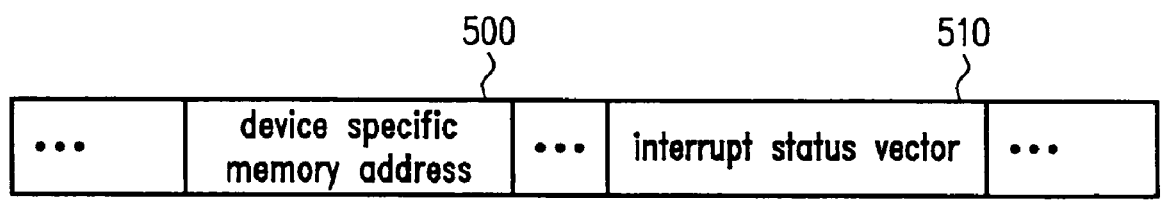
FIG. 5 is a diagram illustrating fields in an interrupt message according to an embodiment.

Referring to FIG. 5, an interrupt message is shown that may be used in the embodiments. As apparent from the figure, each interrupt message comprises a data field 500 that stores a device specific memory address, and a data field 510 that holds an interrupt status vector. It is to be noted that there may be other data fields for other purposes in the message. It is further to be noted that the device specific memory address and/or the interrupt status vector may be located in fields other than data fields, e.g., in a message header, trailer or any other message control field.

Figure 7:
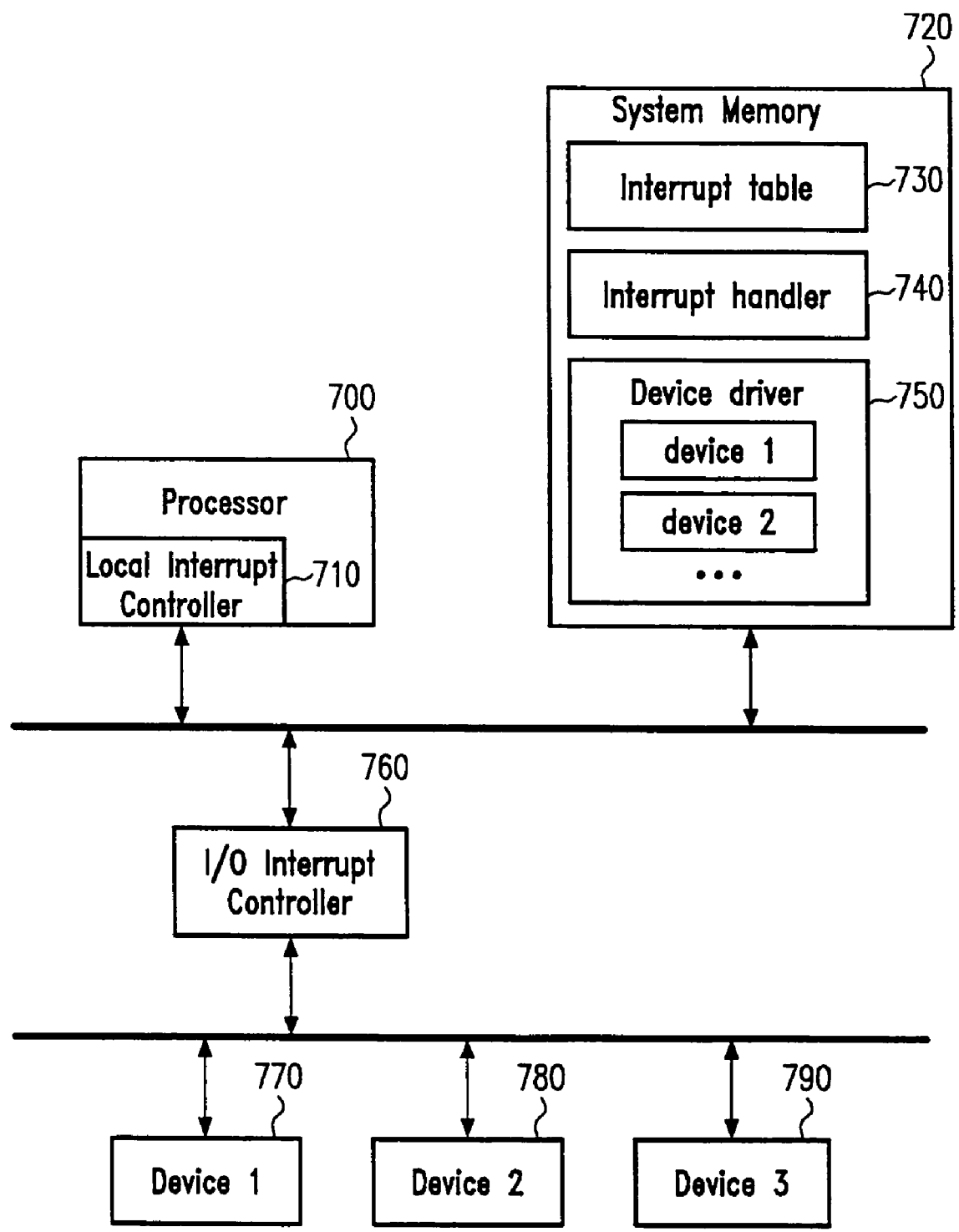
FIG. 7 is a system level diagram illustrating the components that may be used to apply the interrupt processing technique of the embodiments.

Referring now to FIG. 7, the interrupt message of FIG. 5 is sent from one of the peripheral devices 770-790 to the local interrupt controller 710 of the processor 700. This may be done via a southbridge device and/or an I/O interrupt controller 760 which may be located at the southbridge device. In another embodiment, the interrupt message of FIG. 5 is generated by the I/O interrupt controller 760 in response to an interrupt request from an individual one of the devices 770-790.

As will be described in more detail below, the device specific memory address 500 included in the interrupt message shown in FIG. 5 may be used to address the system memory 720 to read information from the interrupt table.

Figure 6:
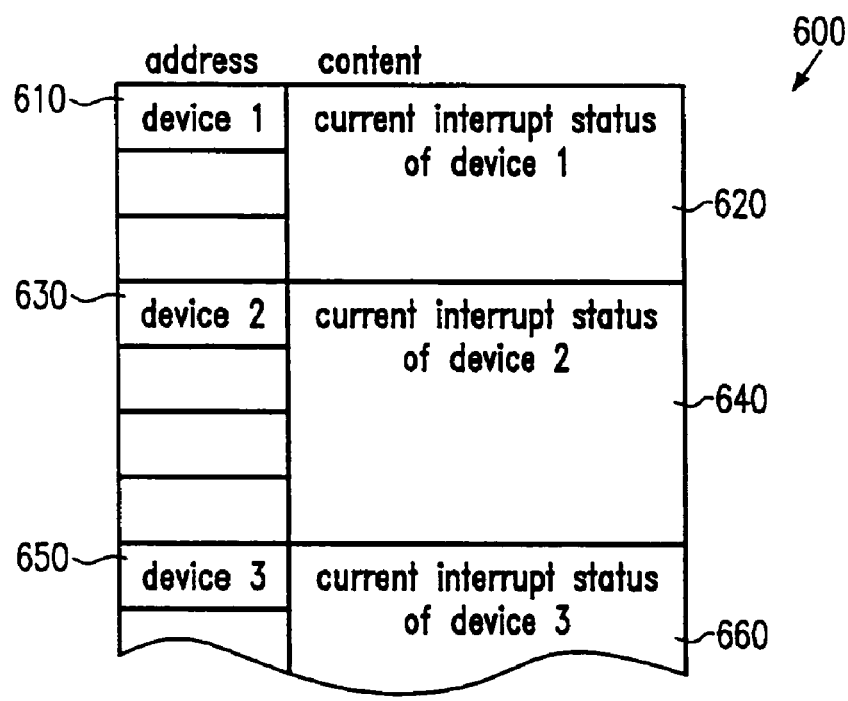
FIG. 6 illustrates a message based interrupt table according to an embodiment.

An embodiment of the interrupt table 600, 730 is shown in FIG. 6. As apparent therefrom, the current interrupt status for each device is stored in memory fields 620, 640, 660 that may be addressed by addresses 610, 630, 650 that are taken from the respective message field 500. In the embodiment, each table entry represents the actual interrupt status of the respective device. The table entries 620, 640, 660 are updated by the local interrupt controller 710 of the processor 700, which merges the interrupt status vector 510 included in an arriving interrupt message with the current interrupt table entry for that device.

That is, the embodiments use a hardware process in the local interrupt controller 710 of the processor 700 to investigate an incoming interrupt message, access and read the interrupt table 600, 730, and update the interrupt table by merging the received interrupt status vector 510 with the currently stored interrupt table entry 620, 640, 660.

Once the interrupt table 600, 730 is updated, a first-level interrupt handler 740 that may be part of the operating system is triggered. In an embodiment, each arriving interrupt message triggers an interrupt handler 740. Triggering the interrupt handler 740 may be the result of sending a hardware interrupt to the processor core.

The interrupt handler 740 then steps from interrupt table entry to interrupt table entry and communicates any new interrupt status to the respective device specific (second-level) interrupt handler, i.e., to the respective device driver 750. That is, since the interrupt table 600, 730 is built from a plurality of individually addressable table fields 620, 640, 660 each pertaining to different devices 770-790 where each table field is addressed by means of the memory address 500 comprised in the interrupt message and each table field 510 holds a respective device specific interrupt status, the interrupt handler 740 identifies device specific interrupt statuses not being settled by sequentially accessing each individually addressable table field. For each unsettled device specific interrupt status, the interrupt handler 740 identifies the corresponding device 770-790 as well as the corresponding device driver interrupt handling routine 750. This device driver interrupt handling routine 750 is the called by the interrupt handler 740 so that the device driver interrupt handling routine 750 can now settle the respective identified device specific interrupt status.

The interrupt table 600, 730 may now be updated to reflect that one or more previously unsettled device specific interrupt statuses have been settled. This my be done by the local interrupt controller 710 of the processor 700. In other embodiments, it is the first-level interrupt handler 740 which updates the interrupt table 600, 730. In yet another embodiment, there is even no need to update the interrupt table 600, 730 since in these embodiments, settlement of device specific interrupt statuses triggers another interrupt message to be sent to the local interrupt controller 710 of the processor 700 so that there is an inherent mechanism that keeps the interrupt table 600, 730 up-to-date all the time.

That is, since the interrupt table 600, 730 is updated in response to an interrupt message that included the interrupt status vector 510 and a device specific memory address 500, the interrupt handler 740 has all information needed to identify the correct device driver 750 without requiring excessive communication to the devices 770-790 and/or the I/O interrupt controller 760 for reading device registers. It is further to be noted that the embodiments do not require the interrupt handler 740 to contact more than one device driver 750 since the interrupt handler 740 already has complete knowledge of the current interrupt status and the respective device. It is also to be noted that in the embodiments, the device-specific interrupt handler has not to inquire the associated device about the interrupt status as the status has been transmitted by means of the interrupt message and has been stored in the interrupt table.

Figure 8:
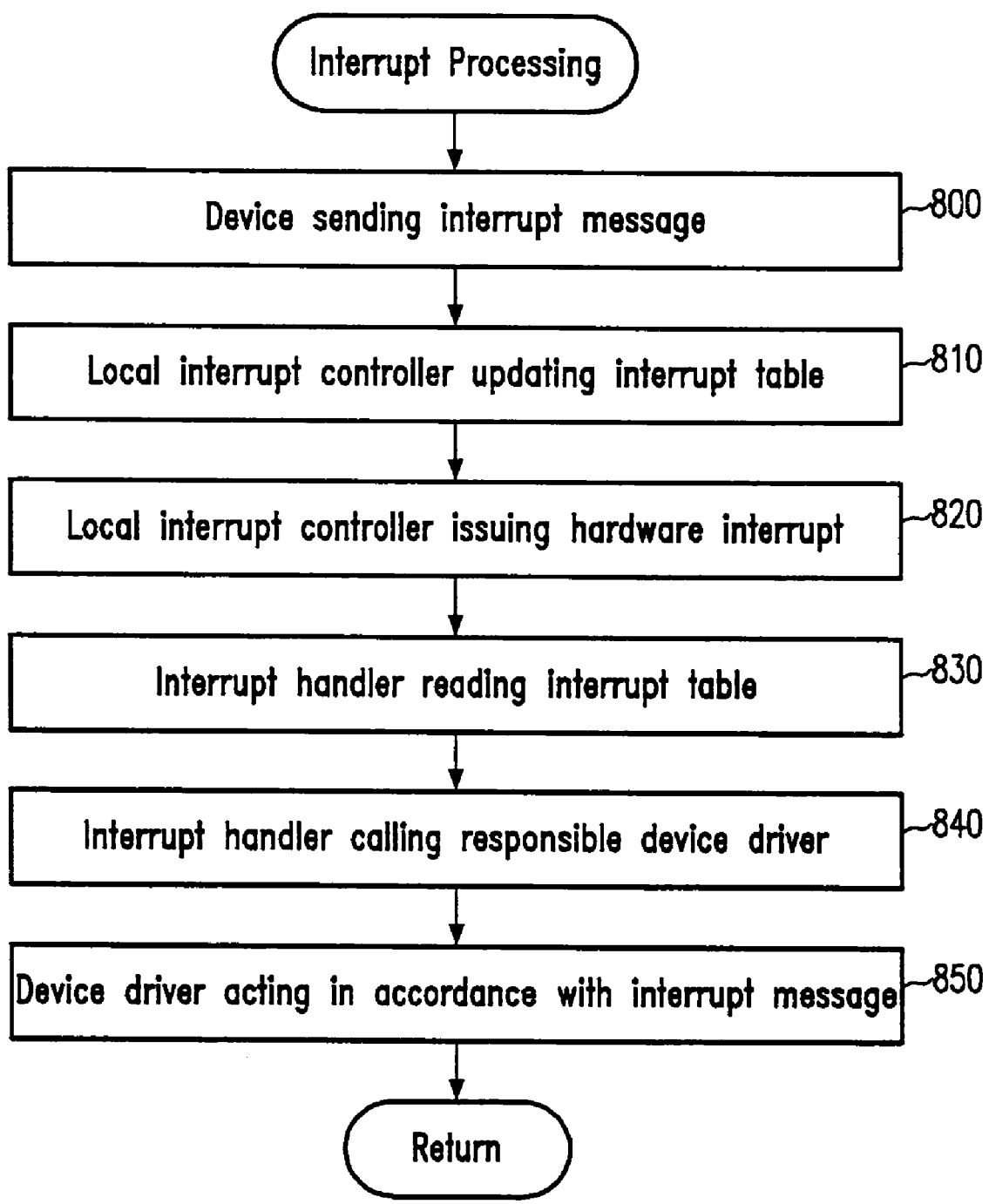
FIG. 8 is a flow chart illustrating an interrupt processing process according to an embodiment.

Turning now to FIG. 8, an interrupt processing process according to an embodiment is depicted. In step 800, an interrupt message is sent to the local interrupt controller 710 of the processor 700. The local interrupt controller 710 then updates the interrupt table 600, 730 in step 810, and generates a hardware interrupt for submission to the processor core (step 820), thereby triggering sending a call request to the first-level interrupt handler 740. This calls the software interrupt handler 740 of the operating system which reads the interrupt table 600, 730 (step 830). The interrupt handler 740 then calls the responsible device driver 750 in step 840, and the device driver may then act in step 850 in accordance with the initially sent interrupt message.

Although not shown in FIG. 8 it is to be noted that the process depicted in the figure may be performed iteratively. That is, once a first interrupt message is sent to the interrupt controller 710 of the processor 700 in response to an interrupt request from one of the devices 770-790, a second interrupt message may be sent to the interrupt controller 710 of the processor 700 in response to another interrupt request from another one of the devices 770-790. The interrupt controller 710 then separately and successively updates the interrupt table 600, 730 and calls the first-level interrupt handler 740 in response to each individual interrupt message. In one embodiment, the same first-level interrupt handler 740 is called twice while in another embodiment, multiple instances of the same first-level interrupt handler 740 are called. In yet another embodiment, the first called interrupt handler 740 is still active when the interrupt controller 710 of the processor 700 generates the second call, and the first called interrupt handler 740 then also assumes the responsability to deal with this second call.

In another embodiment, the interrupt processing process may be as follows. The first level interrupt handler 740 only determines the number of the current interrupt. Based on that number, it calls the device driver interrupt handler of the first device 770-790 that shares the interrupt associated with that interrupt number. The handler then checks whether its associated device has generated the interrupt. Thereafter, it hands over to the device driver interrupt handler of the next device 770-790 that shares the interrupt associated with that interrupt number. This handler then also checks its associated device. That procedure ends when the device driver interrupt handlers of all devices 770-790 that share the interrupt have checked their devices. After that, the interrupt handlers return activity to the operating system which passes activity to the applications/device drivers.

That is, this embodiment makes a distinction between the device driver interrupt handlers and the applications/device drivers. Moreover, the device driver interrupt handlers are sequentially called such that the first level interrupt handler 740 calls the first device driver interrupt handler, the first device driver interrupt handler calls the second first device driver interrupt handler, the second first device driver interrupt handler calls the third first device driver interrupt handler, and so on. As described above, the calling of (or handing over of an interrupt to) a device driver interrupt handler may take only those handlers into account which share the interrupt associated with that interrupt number.

In the various embodiments, the interrupt message can be sent by the device 770-790 itself as well as by a southbridge based interrupt controller (such as the I/O interrupt controller 760) to which the device is connected. Further, the interrupt message can be sent via a dedicated interrupt message bus or via a message-based host bus (such as Hypertransport™ or PCI Express compliant buses).

It is noted that in the embodiments, edge triggered as well as level triggered interrupts may be used.

While in the above description of the various embodiments, the interrupt handler 740 is described to be part of the operating system it is to be noted that the interrupt handler 740 may be realized as separate piece of software in other embodiments. The interrupt handler 740 may even use specific dedicated hardware components in further embodiments.

As apparent from the foregoing description of the embodiments, a technique is provided that may allow for doing all of the interrupt communication from the peripheral devices in one interrupt message so that all interrupt status information for each device is available at any time without further read requests to the devices. This significantly reduces the interrupt latencies, thereby increasing the overall operation speed, and simplifies the interrupt hardware structures.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A method of processing interrupts in a computer system having a memory and at least one processor, said computer system being connected to one or more devices, the method comprising:

in response to an interrupt request from an individual one of said devices, sending an interrupt message to an interrupt controller of the processor, said interrupt message comprising a memory address and interrupt status information, said memory address being specifically allocated to the device having issued the interrupt request, said interrupt status information indicating an interrupt status of said device;

updating, by said interrupt controller, an interrupt table stored in said memory using the interrupt status information comprised in the interrupt message, said interrupt table holding device specific interrupt statuses, wherein updating the interrupt table comprises:

addressing the memory using the memory address comprised in the interrupt message;

wherein the method further comprises, after having updated the interrupt table calling, by said interrupt controller, an interrupt handler;

accessing, by the interrupt handler, said interrupt table to identify device specific interrupt statuses not being settled, wherein said interrupt table comprises a plurality of individually addressable data fields each pertaining to different ones of said devices, each data field being addressed by means of the memory address comprised in said interrupt message, each data field holding a respective device specific interrupt status, and wherein the interrupt handler identifies device specific interrupt statuses not being settled by sequentially accessing each one of said plurality of individually addressable data fields.

2. The method of claim 1, wherein said interrupt handler is part of the operating system running on the computer system.

3. The method of claim 1, wherein calling said interrupt handler comprises:

sending a hardware interrupt to the processor core to trigger sending a call request to said interrupt handler.

4. The method of claim 1, further comprising:

for each unsettled device specific interrupt status, identifying the corresponding device.

5. The method of claim 1, further comprising:

for each unsettled device specific interrupt status, identifying a corresponding device driver interrupt handling routine.

6. The method of claim 5, further comprising:

for each unsettled device specific interrupt status, calling, by the interrupt handler, the identified device driver interrupt handling routine.

7. The method of claim 6, further comprising:

settling, by each called device driver interrupt handling routine, the respective identified device specific interrupt status.

8. The method of claim 7, further comprising:

updating said interrupt table to reflect that one or more previously unsettled device specific interrupt statuses have been settled.

9. The method of claim 8, wherein updating said interrupt table to reflect that one or more previously unsettled device specific interrupt statuses have been settled is performed by the interrupt controller.

10. The method of claim 1, wherein said interrupt message is sent to said interrupt controller of the processor by said individual one of said devices.

11. The method of claim 10, wherein said interrupt message is sent to said interrupt controller of the processor through an interrupt controller of a southbridge device.

12. The method of claim 1, wherein said interrupt message is sent to said interrupt controller of the processor by an interrupt controller of a southbridge device to which said individual one of said devices is connected.

13. The method of claim 1, wherein said interrupt message is sent to said interrupt controller of the processor via an interrupt message bus.

14. The method of claim 1, further comprising:

in response to an interrupt request from another one of said devices, sending a second interrupt message to said interrupt controller of the processor;

updating, by said interrupt controller, said interrupt table stored in said memory using the interrupt status information comprised in the second interrupt message, wherein said interrupt controller of the processor calls an interrupt handler in response to each individual interrupt message.

15. The method of claim 1, wherein said one or more devices connected to said computer system are peripheral devices.

16. A computer system comprising:

at least one processor; and a memory, wherein said computer system is capable of being connected to one or more devices, wherein said at least one processor comprises an interrupt controller connected to receive an interrupt message comprising a memory address and interrupt status information, said memory address being specifically allocated to an individual one of said devices having issued an interrupt request, said interrupt status information indicating an interrupt status of said device, wherein said memory is adapted to store an interrupt table holding device specific interrupt statuses, and wherein said interrupt controller is adapted to address the memory using the memory address comprised in a received interrupt message and update said interrupt table using the interrupt status information comprised in the received interrupt message;

wherein said interrupt controller is further adapted to call, after having updated the interrupt table, an interrupt handler;

wherein said interrupt handler is adapted to access said interrupt table to identify device specific interrupt statuses not being settled;

wherein said interrupt table comprises a plurality of individually addressable data fields each pertaining to different ones of said devices, each data field being addressed by means of the memory address comprised in said interrupt message, each data field holding a respective device specific interrupt status, wherein the interrupt handler is adapted to identify device specific interrupt statuses not being settled by sequentially accessing each one of said plurality of individually addressable data fields.

17. The computer system of claim 16, wherein said interrupt handler is part of the operating system running on the computer system.

18. The computer system of claim 16, wherein said interrupt controller is adapted to call said interrupt handler by sending a hardware interrupt to the processor core to trigger sending a call request to said interrupt handler.

19. The computer system of claim 16, wherein said interrupt handler is adapted to identify a corresponding device for each unsettled device specific interrupt status.

20. The computer system of claim 16, wherein said interrupt handler is adapted to identify a corresponding device driver interrupt handling routine for each unsettled device specific interrupt status.

21. The computer system of claim 20, wherein said interrupt handler is further adapted to call the identified device driver interrupt handling routine for each unsettled device specific interrupt status.

22. The computer system of claim 21, wherein each called device driver interrupt handling routine is adapted to settle the respective identified device specific interrupt status.

23. The computer system of claim 22, wherein said interrupt controller is further adapted to update said interrupt table to reflect that one or more previously unsettled device specific interrupt statuses have been settled.

24. The computer system of claim 16, wherein said interrupt controller of the processor is connected to receive said interrupt message from said individual one of said devices.

25. The computer system of claim 24, wherein said interrupt controller of the processor is connected to receive said interrupt message through an interrupt controller of a southbridge device.

26. The computer system of claim 16, wherein said interrupt controller of the processor is connected to receive said interrupt message from an interrupt controller of a southbridge device of the computer system.

27. The computer system of claim 16, wherein said interrupt controller of the processor is connected to an interrupt message bus to receive said interrupt message.

28. The computer system of claim 16, wherein said interrupt controller of the processor is further adapted to receive a second interrupt message comprising a memory address being specifically allocated to another one of said devices, and update said interrupt table using the interrupt status information comprised in the second interrupt message, wherein said interrupt controller of the processor is further adapted to call an interrupt handler in response to each individual interrupt message.

29. The computer system of claim 16, wherein said one or more devices connected to said computer system are peripheral devices.

30. A processor comprising:

an interrupt controller adapted to receive an interrupt message comprising a memory address and interrupt status information, said memory address being specifically allocated to an individual device having issued an interrupt request, said interrupt status information indicating an interrupt status of said device, wherein said interrupt controller is adapted to address a memory using the memory address comprised in a received interrupt message and update an interrupt table using the interrupt status information comprised in the received interrupt message, said interrupt table being stored in said memory and holding device specific interrupt statuses;

wherein said interrupt controller is further adapted to call, after having updated the interrupt table, an interrupt handler;

wherein said interrupt controller is adapted to cause said interrupt handler to access said interrupt table to identify device specific interrupt statuses not beina settled;

wherein said interrupt table comprises a plurality of individually addressable data fields each pertaining to different devices, each data field being addressed by means of the memory address comprised in said interrupt message, each data field holding a respective device specific interrupt status, wherein said interrupt controller is adapted to cause said interrupt handler to identify device specific interrupt statuses not being settled by sequentially accessing each one of said plurality of individually addressable data fields.

31. The processor of claim 30, wherein said interrupt handler is part of an operating system.

32. The processor of claim 30, wherein said interrupt controller is adapted to call said interrupt handler by sending a hardware interrupt to the processor core to trigger sending a call request to said interrupt handler.

33. The processor of claim 30, wherein said interrupt controller is adapted to cause said interrupt handler to identify a corresponding device for each unsettled device specific interrupt status.

34. The processor of claim 30, wherein said interrupt controller is adapted to cause said interrupt handler to identify a corresponding device driver interrupt handling routine for each unsettled device specific interrupt status.

35. The processor of claim 34, wherein said interrupt controller is adapted to cause said interrupt handler to call the identified device driver interrupt handling routine for each unsettled device specific interrupt status.

36. The processor of claim 35, wherein said interrupt controller is adapted to cause said interrupt handler to call each device driver interrupt handling routine so as to settle the respective identified device specific interrupt status.

37. The processor of claim 36, wherein said interrupt controller is adapted to update said interrupt table to reflect that one or more previously unsettled device specific interrupt statuses have been settled.

38. The processor of claim 30, wherein said interrupt controller of the processor is adapted to receive said interrupt message from an individual one of a plurality of devices.

39. The processor of claim 38, wherein said interrupt controller of the processor is adapted to receive said interrupt message through an interrupt controller of a southbridge device.

40. The processor of claim 30, wherein said interrupt controller of the processor is adapted to receive said interrupt message from an interrupt controller of a southbridge device of the computer system.

41. The processor of claim 30, wherein said interrupt controller of the processor is capable of being connected to an interrupt message bus to receive said interrupt message.

42. The processor of claim 30, wherein said interrupt controller of the processor is further adapted to receive a second interrupt message comprising a memory address being specifically allocated to another device, and update said interrupt table using the interrupt status information comprised in the second interrupt message,
wherein said interrupt controller of the processor is further adapted to call an interrupt handler in response to each individual interrupt message.

43. The processor of claim 30, wherein said device is a peripheral device.

44. A computer readable storage medium configured to store computer executable instructions that, when executed by a processor of a computer system, cause said computer system to perform interrupt handling by operating on an interrupt table stored in a memory of said computer system using interrupt status information comprised in an interrupt message, said interrupt message further comprising a memory address specifically allocated to a device having issued an interrupt request,
said interrupt status information indicating an interrupt status of said device, said interrupt table holding device specific interrupt statuses addressable by the memory address comprised in the interrupt message;
wherein the computer readable storage medium is further configured to:
store computer executable instructions to cause said computer system to operate an interrupt handler;
store computer executable instructions to cause said interrupt handler to access said interrupt table to identify device specific interrupt statuses not being settled; wherein said interrupt table comprises a plurality of individually addressable data fields each pertaining to different devices, each data field being addressed by means of the memory address comprised in said interrupt message, each data field holding a respective device specific interrupt status; and
store computer executable instructions to cause said interrupt handler to identify device specific interrupt statuses not being settled by sequentially accessing each one of said plurality of individually addressable data fields.

45. The computer readable storage medium of claim 44, wherein said interrupt handler is part of the operating system running on the computer system.

46. The computer readable storage medium of claim 44, further storing computer executable instructions to cause said interrupt handler to receive a call request from the processor.

47. The computer readable storage medium of claim 44, further storing computer executable instructions to cause said interrupt handler to identify a corresponding device for each unsettled device specific interrupt status.

48. The computer readable storage medium of claim 44, further storing computer executable instructions to cause said interrupt handler to identify a corresponding device driver interrupt handling routine for each unsettled device specific interrupt status.

49. The computer readable storage medium of claim 48, further storing computer executable instructions to cause said interrupt handler to call the identified device driver interrupt handling routine for each unsettled device specific interrupt status.

50. The computer readable storage medium of claim 49, further storing computer executable instructions to cause each called device driver interrupt handling routine to settle the respective identified device specific interrupt status.

51. The computer readable storage medium of claim 50, further storing computer executable instructions to update said interrupt table to reflect that one or more previously unsettled device specific interrupt statuses have been settled.

52. The computer readable storage medium of claim 44, further storing computer executable instructions to cause said computer system to perform interrupt handling using interrupt status information comprised in a second interrupt message, wherein an interrupt handler is called in response to each individual interrupt message.

* * * * *

UNITED STATES PATENT AND TRADEMARK OFFICE
CERTIFICATE OF CORRECTION

| | |
|---|---|
| PATENT NO. | : 7,257,658 B2 |
| APPLICATION NO. | : 11/011511 |
| DATED | : August 14, 2007 |
| INVENTOR(S) | : Joerg Winkler and Frank Barth |

Page 1 of 1

It is certified that error appears in the above-identified patent and that said Letters Patent is hereby corrected as shown below:

In the Claims:

Claim 30, col. 10, line 31, please change "beina" to -- being --.

Signed and Sealed this

Fourth Day of December, 2007

JON W. DUDAS
*Director of the United States Patent and Trademark Office*